United States Patent
Mendez et al.

(10) Patent No.: US 10,662,117 B2
(45) Date of Patent: May 26, 2020

(54) METHOD OF FABRICATING A PART OUT OF CERAMIC MATRIX COMPOSITE MATERIAL

(71) Applicants: SAFRAN CERAMICS, Le Haillan (FR); CENTRE NATIONAL DE LA RECHERCHE SCIENTIFIQUE (CNRS), Paris (FR)

(72) Inventors: Emilie Mendez, Le Taillan (FR); Jérôme Roger, Pessac (FR); Yann Lepetitcorps, Leognan (FR)

(73) Assignees: SAFRAN CERAMICS, Le Haillan (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/999,681

(22) PCT Filed: Feb. 16, 2017

(86) PCT No.: PCT/FR2017/050348
§ 371 (c)(1),
(2) Date: Aug. 17, 2018

(87) PCT Pub. No.: WO2017/140986
PCT Pub. Date: Aug. 24, 2017

(65) Prior Publication Data
US 2019/0337859 A1 Nov. 7, 2019

(30) Foreign Application Priority Data
Feb. 18, 2016 (FR) .................................. 16 51327

(51) Int. Cl.
*C04B 35/657* (2006.01)
*C04B 35/80* (2006.01)
*C04B 35/628* (2006.01)

(52) U.S. Cl.
CPC ...... *C04B 35/806* (2013.01); *C04B 35/62868* (2013.01); *C04B 35/62873* (2013.01);
(Continued)

(58) Field of Classification Search
CPC ................ C04B 35/806; C04B 35/657; C04B 35/62868; C04B 35/62878;
(Continued)

(56) References Cited

U.S. PATENT DOCUMENTS 5,439,627 A * 8/1995 De Jager ............... B22F 1/0059
264/129
5,840,221 A 11/1998 Lau et al.
(Continued)

FOREIGN PATENT DOCUMENTS

EP 1 391 442 A1 2/2004
RU 2176628 C2 12/2001
(Continued)

OTHER PUBLICATIONS

International Search Report as issued in International Patent Application No. PCT/FR2017/050348, dated May 29, 2017.
(Continued)

*Primary Examiner* — Noah S Wiese
(74) *Attorney, Agent, or Firm* — Pillsbury Winthrop Shaw Pittman LLP

(57) ABSTRACT

A method of fabricating a part out of ceramic matrix composite material, the method including infiltrating a fiber preform with a molten composition including a majority by weight of silicon, the fiber preform including silicon carbide fibers, silicon carbide powder being present in the pores of said preform, a mean size of silicon carbide crystallites in the powder being less than the mean size of the silicon carbide crystallites in the fibers, a ceramic matrix being
(Continued)

formed in the pores of the fiber preform during the infiltration so as to obtain the part made of composite material.

5 Claims, 2 Drawing Sheets

(52) U.S. Cl.
CPC ...... *C04B 35/62878* (2013.01); *C04B 35/657* (2013.01); *C04B 2235/3826* (2013.01); *C04B 2235/428* (2013.01); *C04B 2235/5244* (2013.01); *C04B 2235/5256* (2013.01); *C04B 2235/616* (2013.01)

(58) Field of Classification Search
CPC ...... C04B 35/62873; C04B 2235/3826; C04B 2235/428; C04B 2235/616; C04B 2235/5256; C04B 2235/5244
See application file for complete search history.

(56) References Cited

U.S. PATENT DOCUMENTS

| | | |
|---|---|---|
| 6,261,981 B1 | 7/2001 | Dietrich et al. |
| 7,318,906 B2 * | 1/2008 | Kohyama ............... B82Y 30/00 264/625 |
| 2017/0159459 A1 * | 6/2017 | Courcot .................. F01D 5/284 |

FOREIGN PATENT DOCUMENTS

| | | |
|---|---|---|
| RU | 2184715 C2 | 7/2002 |
| WO | WO 2006/136755 A2 | 12/2006 |
| WO | WO 2016/001026 A1 | 1/2016 |
| WO | WO 2016001026 A1 * | 1/2016 ........... C04B 35/565 |

OTHER PUBLICATIONS

Marchais, A., et al., "Capillary infiltration of hexadecane in packed SiC powder and in SiC/SiC preforms: Pore description and calculation of molten Si infiltration," Ceramics International, vol. 42, No. 6, Feb. 2016, XP029461743, pp. 7774-7780.

Sato, M., et al., "Effect of chopped Si—Al—C fiber addition of the mechanical properties of silicon carbide composite," Journal of Materials Science, vol. 41, No. 22, Sep. 2006, XP019450896, pp. 7466-7473.

International Preliminary Report on Patentability and the Written Opinion of the International Searching Authority as issued in International Patent Application No. PCT/FR2017/050348, dated Aug. 21, 2018.

* cited by examiner

METHOD OF FABRICATING A PART OUT OF CERAMIC MATRIX COMPOSITE MATERIAL

CROSS-REFERENCE TO RELATED APPLICATIONS

This application is the U.S. National Stage of PCT/FR2017/050348 filed Feb. 16, 2017, which in turn claims priority to French patent application number 1651327 filed Feb. 18, 2016. The content of these applications are incorporated herein by reference in their entireties.

BACKGROUND OF THE INVENTION

The invention relates to a method of fabricating a part out of ceramic matrix composite (CMC) material, in which the matrix is formed by melt infiltration (MI), i.e. infiltrating a composition based on silicon in the molten state.

A field of application of the invention is making parts that are to be exposed to high temperatures in service, specifically in the fields of aviation and space, in particular parts for the hot portions of aviation turbine engines, it being understood that the invention can be applied to other fields, e.g. to the field of industrial gas turbines.

CMC materials present good thermostructural properties, i.e. good mechanical properties that make them suitable for constituting structural parts, together with the ability to conserve those properties at high temperatures. The use of CMC materials instead of metal materials for parts that are exposed to high temperatures in service has therefore been recommended, particularly since such materials present density that is considerably less than the density of the metal materials they replace.

A well known method for fabricating CMC parts consists in making a preform from fiber plies made of silicon carbide fibers, then in introducing a silicon carbide powder into the resulting preform, and then in infiltrating the resulting powder-filled preform with molten silicon so as to form a ceramic matrix. The MI method presents the advantage of being much faster and easier to perform than densification by chemical vapor infiltration (CVI). It is nevertheless desirable to further improve the mechanical performance of CMC parts as obtained in this way.

Also known is EP 1 391 442, which, in its paragraph [0011], teaches a technical solution that is closely associated with the situation in which the matrix is formed by sintering a powder.

There therefore exists a need to improve the mechanical properties of ceramic matrix composite material parts obtained by melt infiltration of a silicon-based composition.

OBJECT AND SUMMARY OF THE INVENTION

To this end, in a first aspect, the invention provides a method of fabricating a part made out of ceramic matrix composite material, the method comprising at least the following steps:

infiltrating a fiber preform with a molten composition comprising a majority by weight of silicon, the fiber preform comprising silicon carbide (SiC) fibers, silicon carbide powder being present in the pores of said preform, the mean size of the silicon carbide crystallites in the powder being less than the mean size of the silicon carbide crystallites in the fibers, a ceramic matrix being formed in the pores of the fiber preform during the infiltration so as to obtain the part made of composite material.

The term "a molten composition comprising a majority by weight of silicon" is used to mean that the content by weight of silicon in the molten composition is greater than or equal to 50%.

The mean size of the silicon carbide crystallites present in the material can be determined from the result of an X-ray diffraction test (XRD) by applying Scherrer's formula. Scherrer's formula is as follows:

$$t_{mean} = 0.9\lambda / [\varepsilon \times \cos(2\theta/2)]$$

where $t_{mean}$ is the mean size of the silicon carbide crystallites in the material, $\lambda$ is the wavelength of the X-rays, $\varepsilon$ is the half-height width measured in radians of a line relating to silicon carbide, and $2\theta$ is the position in degrees (°) of the top of the line in the diffraction diagram. In special circumstances in which Scherrer's law runs the risk of providing results that are approximate, e.g. because there is significant overlap between two neighboring lines, it is possible to use Rietveld's method. That method consists in simulating a diffraction diagram from a crystallographic model of the sample, and then in adjusting the parameters of the model so that the simulated diffraction diagram is as close as possible to the experimental diffraction diagram. These steps can be performed using specific software such as FullProf, TOPAS, MAUD, and FAULTS.

In the invention, an SiC powder is used that, prior to infiltration, has SiC crystallites with a mean size less than the mean size of the SiC crystallites in the fibers. Using such a powder serves advantageously to reduce, or even to avoid, the SiC fibers of the fiber preform being attacked by the molten composition during infiltration. The invention thus serves advantageously to reduce, or even to avoid, the SiC fibers of the fiber preform being degraded during infiltration of the molten composition, thereby improving the mechanical properties of the CMC parts that are fabricated, and in particular improving the elastic limit of such parts.

Specifically, the inventors have observed that the degree of interaction between the molten silicon composition and the silicon carbide increases with decreasing diameter of the SiC crystallites. Thus, by using a powder as described above, the interactions between the molten composition and the SiC of the powder are increased compared with the interactions between the molten composition and the SiC of the fibers. As a result, the SiC fibers are degraded less during the infiltration with the molten composition, and thus the mechanical properties of the resulting parts are improved.

In an implementation, prior to infiltration, the fiber preform may present a consolidation phase comprising silicon carbide, the mean size of the silicon carbide crystallites in the powder being less than the mean size of the silicon carbide crystallites in the consolidation phase.

In a manner analogous to that described in detail above concerning SiC fibers, the fact that the powder presents SiC crystallites of a mean size less than the mean size of the SiC crystallites in the consolidation phase serves advantageously to reduce, or even to avoid, the consolidation phase being attacked during infiltration by the molten composition, thereby improving the mechanical properties of the resulting part.

In an implementation, the mean size of the silicon carbide crystallites in the powder may be less than or equal to 80% of the mean size of the silicon carbide crystallites in the fibers. In particular, the mean size of the silicon carbide crystallites in the powder may be less than or equal to half of the mean size of the silicon carbide crystallites in the fibers.

Such implementations serve advantageously to still further reduce interactions between the SiC fibers and the molten composition, thereby further improving the mechanical properties of the resulting part.

In the same manner, when a consolidation phase comprising SiC is formed, the mean size of the SiC crystallites in the powder may be less than or equal to 80% of the mean size of the SiC crystallites in the consolidation phase. In particular under such circumstances, the mean size of the SiC crystallites in the powder may be less than or equal to half the mean size of the SiC crystallites in the consolidation phase.

In an implementation, an interphase may be formed on the fibers before the infiltration step. In particular, the interphase may be formed by at least one layer of the following materials: pyrolytic carbon (PyC), boron-doped carbon (DC), of boron nitride (BN).

In an implementation, the fiber preform is formed initially, then the silicon carbide powder is introduced into the pores of said preform, and thereafter the above-described infiltration is performed. In a variant, a plurality of textures filled with silicon carbide powder are assembled together so as to obtain the fiber preform filled with said powder, and then the above-described infiltration is performed.

The fiber preform may be made as a single piece by three-dimensional weaving or it may be made from a plurality of two-dimensional fiber plies.

By way of example, the part made by the above-described method may be a turbine engine part. By way of example, the part may be a turbine ring or a turbine ring sector, a blade, a vane, or a nozzle.

BRIEF DESCRIPTION OF THE DRAWINGS

Other characteristics and advantages of the invention appear from the following description, which is given in nonlimiting manner and with reference to the accompanying drawings, in which.

DETAILED DESCRIPTION OF EMBODIMENTS

Figure 1:
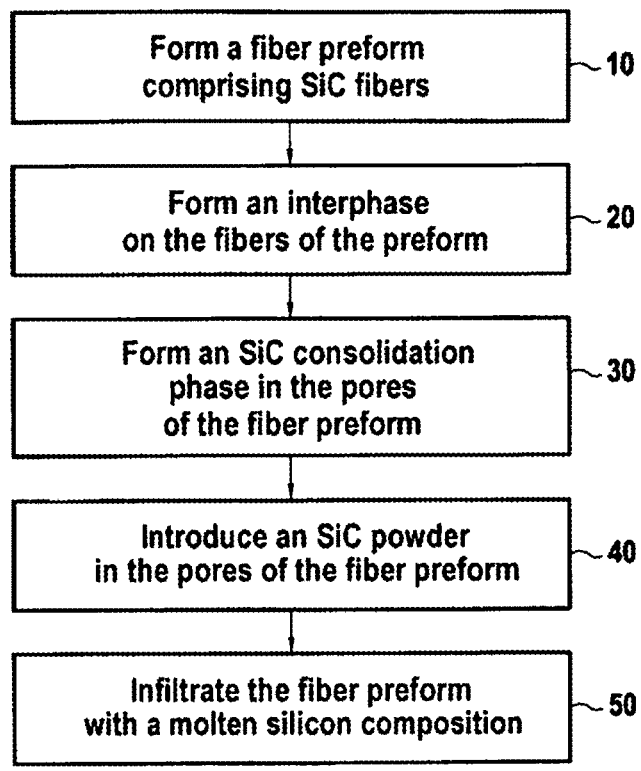
FIG. 1 is a flowchart of an example of a method of the invention.

The various steps of an example of a method of the invention are shown in FIG. 1.

Initially, a fiber preform comprising silicon carbide fibers is formed (step 10). The fiber preform is to form the fiber reinforcement of the part that is to be obtained. The fibers used may be silicon carbide (SiC) fibers supplied under the names "Nicalon", "Hi-Nicalon", or "Hi-Nicalon-S" by the Japanese supplier Nippon Carbon, or under the name "Tyranno SA3" by the supplier UBE.

The fiber preform may be obtained by three-dimensional weaving between a plurality of layers of warp yarns and a plurality of layers of weft yarns. The three-dimensional weaving may be performed using an "interlock" weave, i.e. a weave in which each layer of weft yarns interlinks a plurality of layers of warp yarns, with all of the yarns in the same weft column having the same movement in the weave plane.

Various suitable weaving techniques are described in Document WO 2006/136755.

The fiber preform may also be obtained by assembling together a plurality of fiber textures. Under such circumstances, the fiber textures may be linked together, e.g. by stitching or needling. Specifically, each of the fiber textures may be obtained from a layer or a stack of a plurality of layers of:
  unidimensional (UG) fabric;
  two-dimensional (2D) fabric;
  braid;
  knit;
  felt; or
  a sheet of yarns or tows that is unidirectional (UD) or multidirectional (nD) and obtained by superposing a plurality of UD sheets in different directions and linking together the UD sheets together, e.g. by stitching, by a chemical bonding agent, or by needling.

With a stack of a plurality of layers, they may be linked together, by way of example, by stitching, by implanting yarns or rigid elements, or by needling.

Once the preform has been formed, an embrittlement relief interphase may be formed on the fibers of the preform (step 20).

In known manner, it is preferable to perform surface treatment on the fibers prior to forming the interphase in order to eliminate the sizing and a surface layer of oxide such as silica $SiO_2$ present on the fibers. The interphase may be formed by CVI. The interphase may comprise one layer or multiple layers. The interphase may include one or more layers of pyrolytic carbon (PyC), of boron nitride (BN), or of boron-doped carbon, written BC (where the boron-doped carbon presents an atom content of boron lying in the range 5% to 20%, the remainder being carbon). The thickness of the interphase may be greater than or equal to 10 nanometers (nm), and for example may lie in the range 10 nm to 1000 nm. Naturally, it would not go beyond the ambit of the invention for the interphase to be formed on the fibers prior to forming the preform.

Thereafter, a consolidation phase comprising silicon carbide can be formed in the pores of the fiber preform in conventional manner (step 30). The consolidation phase may be formed by chemical vapor infiltration. The consolidation phase may comprise silicon carbide only. In a variant, in addition to silicon carbide, the consolidation phase may include a self-healing material. It is possible to select a self-healing material containing boron, e.g. a ternary Si—B—C system or boron carbide $B_4C$, that is capable in the presence of oxygen of forming a glass of borosilicate type having self-healing properties. The thickness of the deposit of the consolidation phase may be greater than or equal to 500 nm, e.g. lying in the range 1 micrometer (μm) to 30 μm. The outer layer of the consolidation phase (the layer furthest from the fibers) is advantageously made of silicon carbide so as to constitute a barrier against reaction between the underlying fibers and the subsequently introduced molten silicon composition.

The thickness of the consolidation phase is sufficient to consolidate the fiber preform, i.e. to link together the fibers of the preform sufficiently to enable the preform to be handled while conserving its shape without assistance from support tooling. After such consolidation, the preform remains porous, e.g. with only a minority fraction of the initial pore volume being occupied by the interphase and by the consolidation phase.

Thereafter, SiC powder is introduced into the pores of the consolidated fiber preform (step 40). To do this, the consolidated preform is impregnated with a slurry containing the powder in suspension in a liquid medium, e.g. water. The powder may be retained in the preform by filtering or by settling, possibly with the assistance of suction. It is preferable to use a powder made up of SiC particles having a mean size (D50) that is less than or equal to 5 µm, or indeed less than or equal to 1 µm. The SiC powder that is introduced is such that the mean size of the SiC crystallites in the powder is both less than the mean size of the SiC crystallites in the fibers and also less than the mean size of the SiC crystallites in the consolidation phase.

Before infiltration with the molten composition, the silicon carbide powder is present in the pores of the fiber preform. Before infiltration, the powder presents SiC crystallites presenting a mean size satisfying the above-specified condition. In addition to SiC particles, particles of some other material, e.g. such as carbon, may be present in the porers of the fiber preform.

Thereafter, the fiber preform is infiltrated by the molten composition comprising a majority by weight of molten silicon (step 50). This composition may correspond to molten silicon on its own or to an alloy of silicon in the molten state that also contains one or more other elements such as titanium, molybdenum, boron, iron, or niobium. The content by weight of silicon in the molten composition may be greater than or equal to 90%. As explained above, because of the small size of the SiC crystallites in the powder, the molten composition interacts preferentially with the powder during infiltration, and consequently interacts less with the SiC present in the consolidation phase or in the fibers, thereby serving to improve the mechanical properties of the resulting part.

In association with the example shown in FIG. 1, a method of fabricating a ceramic matrix composite material part is thus described that comprises at least the following steps:
  forming a fiber preform comprising silicon carbide fibers;
  introducing a silicon carbide powder into the pores of the fiber preform, the mean size of the silicon carbide crystallites in the powder being less than the mean size of the silicon carbide crystallites in the fibers; and
  infiltrating the fiber preform filled with the silicon carbide powder with a molten composition comprising a majority by weight of silicon, a ceramic matrix being formed in the pores of the fiber preform during the infiltration so as to obtain the composite material part.

An interphase and/or a consolidation phase may be formed on the fibers after the preform has been formed and before introducing the powder, as mentioned above.

In a variant, the method of fabricating the part may comprise at least the following steps:
  forming a fiber preform by assembling together a plurality of fiber textures comprising silicon carbide fibers, a silicon carbide powder being present in the pores of said textures, the mean size of silicon carbide crystallites in the powder being less than the mean size of silicon carbide crystallites in the fibers; and
  infiltrating the resulting fiber preform with a molten composition comprising a majority by weight of silicon, a ceramic matrix being formed in the pores of the fiber preform during the infiltration so as to obtain the composite material part.

EXAMPLES

Example 1 (Invention)

A fiber preform made of silicon carbide fibers presenting SiC crystallites having a mean size of 30 nm was used. The SiC fibers used are sold under the name Hi-Nicalon Type S by the supplier NGS. An interphase comprising a single layer of pyrolytic carbon was initially formed on the fibers by chemical vapor infiltration. Thereafter, the preform was densified with an SiC consolidation phase formed by chemical vapor infiltration. The mean size of the SiC crystallites in the resulting consolidation phase was 30 nm. A slurry containing an SiC powder presenting SiC crystallites having a mean size of 15 nm was then introduced into the pores of the consolidated fiber preform. After drying the preform as impregnated in this way, the fiber preform was infiltrated with an infiltration composition comprising a majority of molten silicon. The infiltration composition used presented a molar content of silicon of 96%, and a molar content of boron of 4%. During infiltration, the temperature was maintained at 1445° C. for 45 minutes (min) under a partial pressure of argon.

Figure 2:
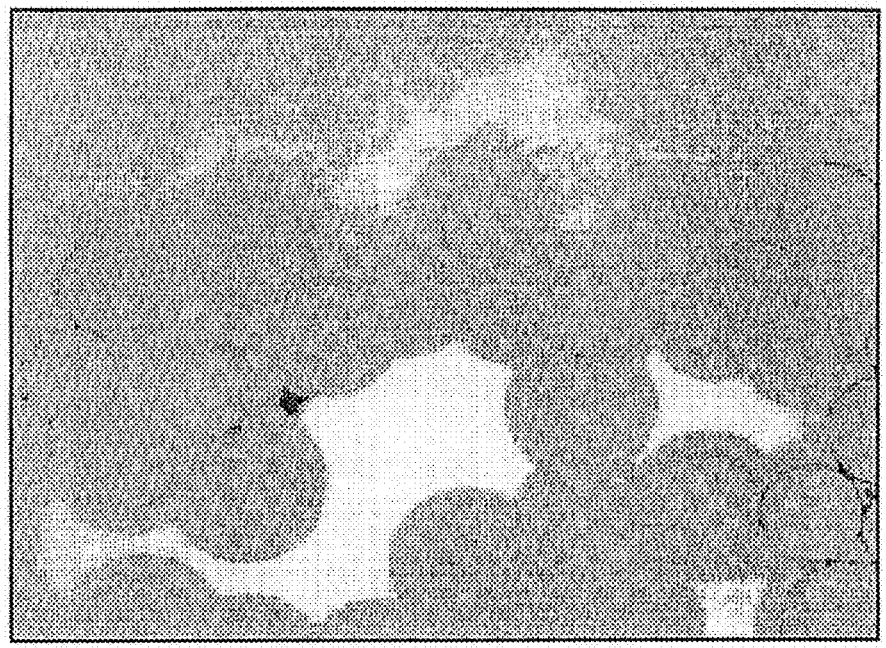
FIG. 2 is a photograph of a part obtained by performing an example of a method of the invention.

FIG. 2 is a photograph of the results obtained in this way. It can be seen that the consolidation phase has not been damaged during infiltration, thereby conferring improved mechanical properties on the part.

Example 2 (Not the Invention)

The same operating protocol as in Example 1 was performed, with the exception that the consolidated preform was impregnated with a slurry comprising an SiC powder presenting crystallites having a mean size of 120 nm.

Figure 3:
FIG. 3 is a photograph of a part obtained by performing a method that is not of the invention.

FIG. 3 is a photograph of the results obtained in this way. It can be seen that the consolidation phase was damaged during infiltration, thereby producing a part presenting mechanical properties that are not as good as those of the part produced in the context of Example 1.

Figure 4:
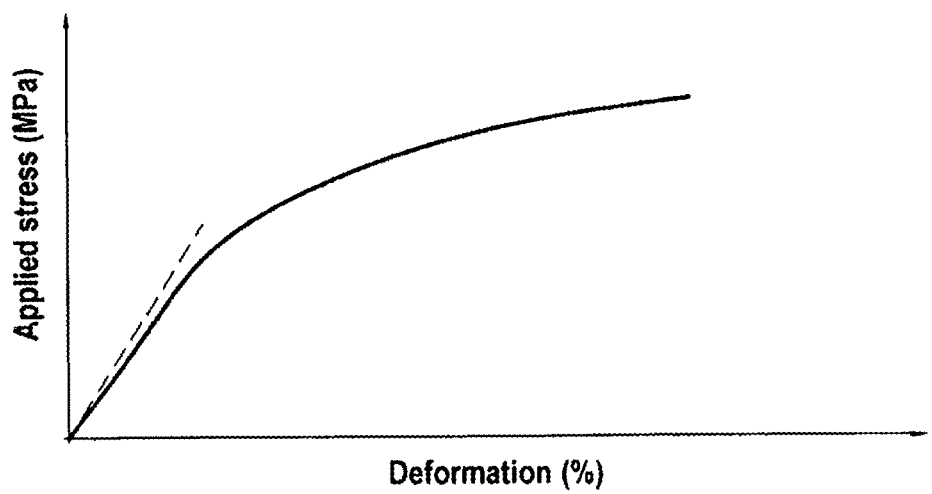
FIG. 4 compares the results obtained during a traction test, depending on whether or not the part being evaluated was obtained by performing a method of the invention.

FIG. 4 shows the results obtained during a traction test, performed until rupture and at ambient temperature, on the part obtained by performing Example 1 (continuous line), and on the part obtained by performing Example 2 (dashed line). This test result confirms that the part obtained by performing a method of the invention presents mechanical properties better than those obtained by performing the method of Example 2, which is not of the invention.

The term "lies in the range . . . to . . . " should be understood as including the bounds.

The invention claimed is:

1. A method of fabricating a part out of ceramic matrix composite material, the method comprising:
  infiltrating a fiber preform with a molten composition comprising a majority by weight of silicon, the fiber preform comprising silicon carbide fibers, silicon carbide powder being present in the pores of said preform, a mean size of silicon carbide crystallites in the powder being less than the mean size of the silicon carbide crystallites in the fibers, a ceramic matrix being formed in the pores of the fiber preform during the infiltration so as to obtain the part made of composite material, wherein prior to infiltration, the fiber preform presents a consolidation phase comprising silicon carbide, the mean size of the silicon carbide crystallites in the powder being less than or equal to 80% of the mean size of the silicon carbide crystallites in the consolidation phase.

2. A method according to claim 1, wherein the mean size of the silicon carbide crystallites in the powder is less than or equal to 80% of the mean size of the silicon carbide crystallites in the fibers.

3. A method according to claim 1, wherein an interphase is formed on the fibers before the infiltration step.

4. A method according to claim 3, wherein the interphase is formed by at least one layer of the following materials: pyrolytic carbon, boron-doped carbon, or boron nitride.

5. A method according to claim 1, wherein the fiber preform is made as a single piece by three-dimensional weaving or from a plurality of two-dimensional fiber plies.

* * * * *